Figure 1:
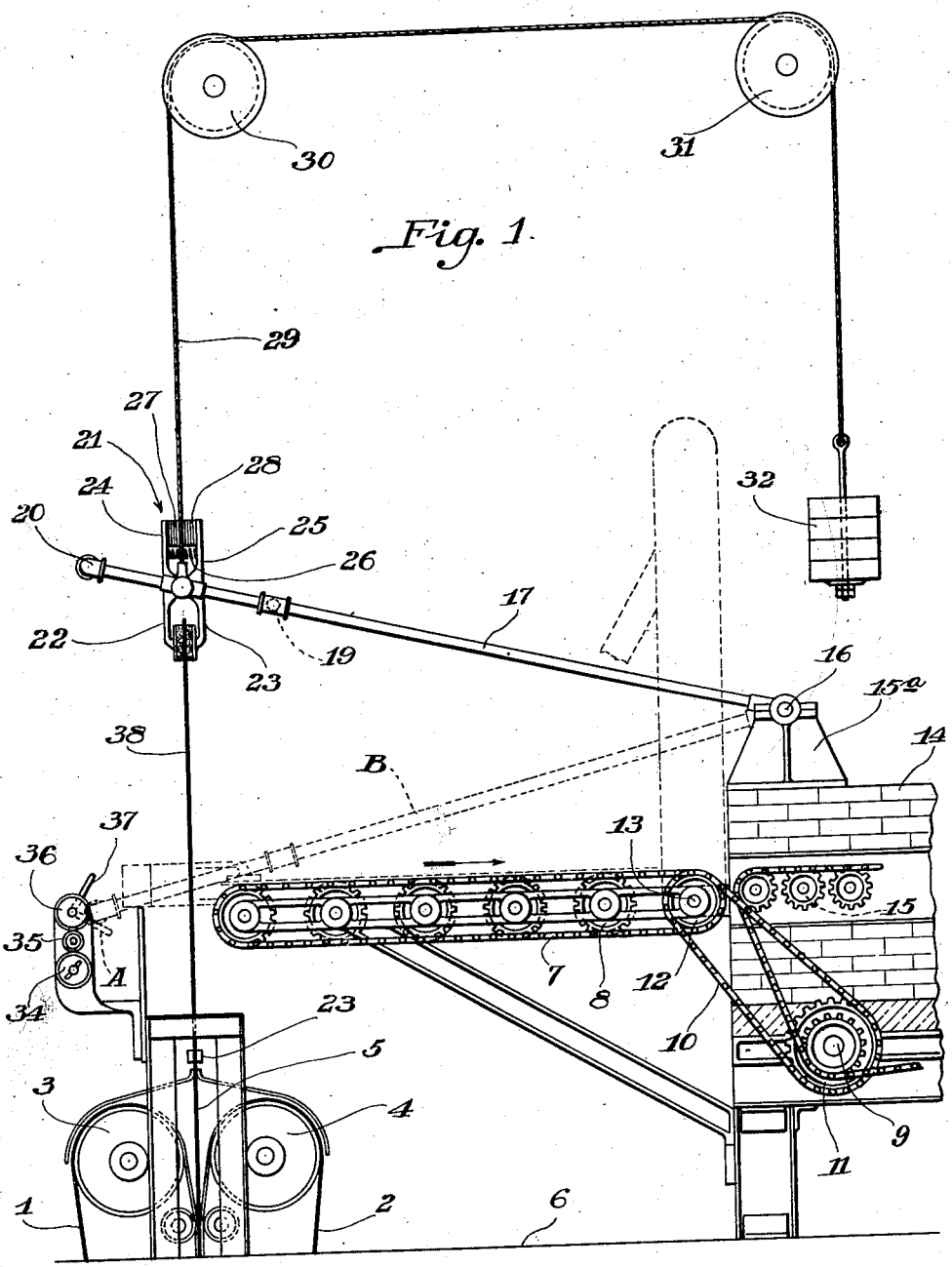

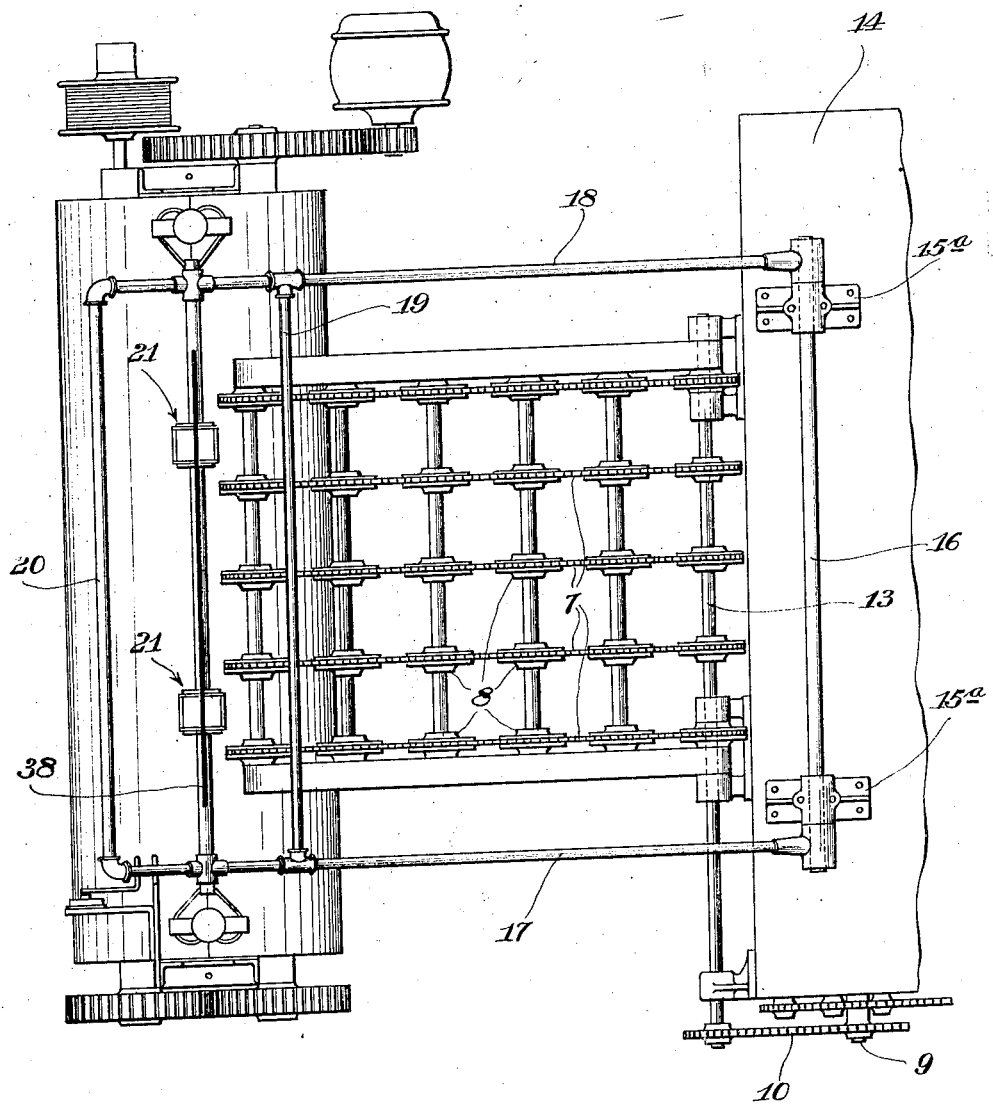

Patented Feb. 3, 1925.

1,525,124

UNITED STATES PATENT OFFICE.

JOHN H. FOX, OF PITTSBURGH, PENNSYLVANIA, ASSIGNOR TO PITTSBURGH PLATE GLASS COMPANY, A CORPORATION OF PENNSYLVANIA.

APPARATUS FOR HANDLING GLASS SHEETS.

Application filed February 16, 1924. Serial No. 693,260.

*To all whom it may concern:*

Be it known that I, JOHN H. FOX, a citizen of the United States, and a resident of Pittsburgh, in the county of Allegheny and State of Pennsylvania, have made a new and useful invention in Improvements in an Apparatus for Handling Glass Sheets, of which the following is a specification.

The invention relates to apparatus for handling glass sheets as produced in a continuous vertical drawing operation such as that shown and described in the application of H. G. Slingluff, Serial Number 621,184, wherein the glass is drawn between a pair of asbestos belts, at the upper ends of which the glass emerges and is cut into lengths. The present invention has for its objects, the provision of improved means for supporting the glass sheets after they are cut off and placing them upon a horizontal carrier device, thus relieving the operator or operators of a considerable part of the hand labor otherwise required. As illustrated, the horizontal carrier to which the sheets are transferred leads to a leer for annealing, or flattening, or both, but in some cases, the leer may not be required and the carrier may lead to a point where the sheets are removed and stacked for storage or further transfer, or to the cutting room. One embodiment of the invention is illustrated in the accompanying drawing wherein:

Figure 1 is a side elevation of the apparatus. And Fig. 2 is a plan view thereof.

Referring to the drawings, 1 and 2 are a pair of endless asbestos belts such as are illustrated in the Slingluff application hereinbefore referred to, such belts passing over the pulleys 3 and 4 at their upper ends. And 5 is a continuous glass sheet or ribbon which is being drawn from a molten bath, the apparatus lying below the floor 6, preferably being the same throughout as shown in the Slingluff application referred to, although the present invention is not limited to any particular type of vertical drawing apparatus. Extending laterally from the line of draw of the apparatus is an endless carrier made up of a plurality of chains 7 passing around a plurality of sprockets 8. The chains are continuously driven in the direction indicated by the arrow from a drive shaft 9 through the intermediary of the sprocket chain 10, passing around the sprockets 11 and 12 on the ends of the shafts 9 and 13 respectively.

This endless carrier preferably delivers to a roller leer 14 provided with a series of rollers 15 for supporting the glass sheets, which are passed through the leer in case the sheets require any further annealing or flattening. Mounted upon the top of the leer are brackets 15ª carrying a shaft 16 which supports a framework made up of the pipes 17, 18, 19 and 20, the last mentioned pipe serving as a handle for the frame. Pivotally mounted upon the pipe 19 are a pair of clamps 21, such clamps being similar and each being made up of a pair of jaws 22 and 23, arranged with crossed handles 24 and 25 like a pair of pincers, so that 24 is the handle of the jaw 23 and 25 is the handle of the jaw 22. The jaws are normally held open by means of springs 26 and are closed in order to cause the jaws to clamp the edge of the glass sheet by means of a pair of magnets 27 and 28 carried by the handles 24 and 25. If desired, some other form of clamp might be employed, such as a hand operated clamp, in which the jaws are normally held closed by springs instead of being held open as in the present case. The clamping device is preferably counterweighted by means of ropes 29 passing around the pulleys 30 and 31 and provided with weights 32. The weights 32 are such that when the clamp is not in engagement with the glass, it will maintain itself in any vertical position in which it is placed, and the weight of the parts of each clamp below the pivot bar 19 is preferably greater than that of the parts above such pivot bar, so that the clamp will normally lie in a vertical position, thus rendering it more convenient for the operator to handle and to place in engagement with the glass than would otherwise be the case.

The glass is preferably cut off as it emerges from between the belts 1 and 2 by means of the electrical cut off 33. This cut off is shown and described in the patent issued to H. G. Slingluff No. 1,373,533 of April 5, 1921, and comprises a pair of electrically heated ribbons clamped on opposite sides of the glass sheet. After the glass is heated by this device along the line of cut, the cracking off is accomplished by applying a little moisture or by starting the crack with a glass cutter. The kind of cutter, however, is immaterial in so far as the present invention is concerned, and other methods of cutting off might be employed, although the one illustrated is preferable because it has been found particularly adapted for cutting relatively hot glass which may be imperfectly annealed. The two ribbons are preferably clamped in position on opposite sides of the glass by means of the electro-magnetic means shown in the Slingluff patent and this means is controlled from the electric switch 34, the switch 35 being employed for controlling the application of current through the ribbons. A third switch 36 having the handle 37 controls the application of current through the magnets 24 and 25, which cause the jaws 22 and 23 to engage the glass sheet which is being handled. This switch is preferably operated automatically from the handle bar 20 when this handle bar is lowered during the placing of the sheet 38 upon the endless carrier chains 7.

Starting with the parts in the position shown, with the sheet 38 supported by the clamping jaws 22 and 23, the operation is as follows: The operator swings the edge of the sheet 38 supported by the clamps to the right until it rests upon the carrier chains 7. The weight of the sheet added to that of the clamping devices is sufficient to overbalance the counterweights 32, so that as the chains 7 carry the lower edge of the sheet 38 to the right, the clamping devices move downward by gravity, which action continues until the sheet lies flatwise upon the chains. At this time the clamping frame occupies the position indicated at B in dotted lines in Fig. 1. When this occurs, the handle bar 20 engages the handle 37 of the switch 36, moving it to the dotted line position marked A and breaking the circuit through the magnets 27 and 28, so that the upper edge of the sheet 38 is released from the clamping jaws 22 and 23, and the sheet is free to be carried by the chains 7 to the right into the leer. It will be noted that during the downward movement of the clamps 21, such clamps were free to follow the changing angle of the sheet 38 due to their pivotal support upon the pivot bar 19. The jaws 22 and 23 having been released from the sheet 38 are in position to engage the upper edge of the ribbon 5 which has been advancing upward during the time consumed in handling the sheet 38. This edge passes between the jaws and the operator causes the clamps to engage the edge by operating the handle 37 to bring it back to its original position. The clamping device now moves upward with the sheet until another length of glass has advanced sufficiently to provide a new sheet, and the switches 34 and 35 are operated to actuate the cutting off device 33. As soon as the glass is severed, the operator moves the clamping frame upward to the position illustrated and then swings the lower edge of the sheet to the right on to the chain 7, thus completing the cycle of operations. During the upward movement of the clamps, the pivot bar 19 does not move in a true vertical plane, due to the fact that the frame moves on an arc around the bar 16, but this condition is taken care of by reason of the pivotal support of the clamps 21 upon the pivot bar 19 so that there is no tendency of the clamps to divert the sheet from a true vertical plane and thus impose a strain thereon. It will be seen that the apparatus renders the handling of the glass sheets convenient and safe for the operator, who at no time is required to support the sheet in his hands, so that a single operator can safely and easily take care of the cutting off of the sheet and its transfer to the carrier device. Other advantages incident to the simplicity of the device and the ease with which it may be handled, will be readily apparent to those skilled in the art.

What I claim is:

1. The combination with a vertical sheet glass drawing machine, of a counterbalanced clamping device above the machine adapted to engage the upper edge of the sheet and move upward therewith and give it support during and after the cutting off operation, and a driven carrier extending laterally from a position adjacent the side of the sheet in position to receive the lower edge of the sheet when the clamp is in its upper position.

2. The combination with a vertical sheet glass drawing machine, of a counterbalanced clamping device above the machine adapted to engage the upper edge of the sheet and move upward therewith and give it support during and after the cutting off operation, and a driven carrier extending laterally from a position adjacent the side of the sheet in position to receive the lower edge of the sheet when the clamp is in its upper position, the counterbalance of the clamping device being such that the device will maintain itself in any vertical position in which it is placed when not in engagement with or supporting the glass.

3. The combination with a vertical sheet glass drawing machine, of a counterbalanced clamping device above the machine adapted to engage the upper edge of the sheet and move upward therewith and give it support during and after the cutting off operation, and a driven carrier extending laterally from a position adjacent the side of the sheet in position to receive the lower edge of the sheet when the clamp is in its upper position, the clamping device being so counterbalanced that when the lower edge of the glass sheet supported by the clamping device is placed upon the carrier, the weight of the clamping device and sheet will cause them to move downward until the sheet is supported flatwise on the carrier.

4. The combination with a vertical sheet glass drawing machine, of a counterbalanced clamping device above the machine adapted to engage the upper edge of the sheet and move upward therewith and give it support during and after the cutting off operation, a swinging frame for guiding the clamping device during its vertical movements, and a driven carrier extending laterally from a position adjacent the side of the sheet.

5. The combination with a vertical sheet glass drawing machine, of a counterbalanced clamping device above the machine, comprising a pair of clamping jaws pivoted together adapted to engage the upper edge of the sheet and move upward therewith and give it support during and after the cutting off operation, yielding means normally holding the jaws open, and electro-magnetic means for closing the jaws to cause them to engage the sheet, and a driven carrier extending laterally from a position adjacent the side of the carrier.

6. The combination with a vertical sheet glass drawing machine, of a counterbalanced clamping device above the machine adapted to engage the upper edge of the sheet and move upward therewith and give it support during and after the cutting off operation, and a driven carrier extending laterally from a position adjacent the side of the sheet in position to receive the lower edge of the sheet when the clamp is in its upper position, the said clamping device being pivotally supported on a horizontal axis parallel to the plane of the sheet.

7. The combination with a vertical sheet glass drawing machine, of a counterbalanced clamping device above the machine adapted to engage the upper edge of the sheet and move upward therewith and give it support during and after the cutting off operation, and a driven carrier extending laterally from a position adjacent the side of the sheet in position to receive the lower edge of the sheet when the clamp is in its upper position, the said clamping device being pivotally supported on a horizontal axis lying in the plane of the sheet.

8. The combination with a vertical sheet glass drawing machine, of a counterbalanced clamping device above the machine adapted to engage the upper edge of the sheet and move upward therewith and give it support during and after the cutting off operation, a swinging frame for guiding the clamping device during its vertical movements, and a driven carrier extending laterally from a position adjacent the side of the sheet, the said clamping device being pivotally supported on an axis extending longitudinally of the upper edge of the sheet.

In testimony whereof, I have hereunto subscribed my name this 14th day of February, 1924.

JOHN H. FOX.